United States Patent [19]
Lee et al.

[11] Patent Number: 5,636,912
[45] Date of Patent: Jun. 10, 1997

[54] LIQUID CRYSTAL PROJECTOR

[75] Inventors: Nam S. Lee; Myung K. Yeo; Sang J. Lee; Joong I. Shin, all of Kyungki-do, Rep. of Korea

[73] Assignee: LG Electronics Inc., Seoul, Rep. of Korea

[21] Appl. No.: 529,073

[22] Filed: Sep. 15, 1995

[30] Foreign Application Priority Data

Sep. 15, 1994 [KR]  Rep. of Korea .................. 23432/1994

[51] Int. Cl.⁶ .................................................. G03B 21/14
[52] U.S. Cl. .................................................. 353/46
[58] Field of Search ........................... 353/37, 46, 50, 353/51, 69, 70, 38; 348/773, 770; 359/40, 209, 210, 211

[56]  References Cited

U.S. PATENT DOCUMENTS 3,767,299  10/1973  Fisher ........................... 353/46
4,779,024  10/1988  Roussin ........................... 348/770
4,917,487   4/1990  Cruickshank ..................... 353/46
5,196,875   3/1993  Stückler ......................... 353/46
5,400,095   3/1995  Minich et al. .................... 353/98
5,459,539  10/1995  Yamamoto ....................... 353/119
5,467,207  11/1995  Forkuer et al. ................... 353/38

*Primary Examiner*—William Dowling
*Attorney, Agent, or Firm*—Morgan, Lewis and Bockius LLP

[57]  ABSTRACT

A liquid crystal projector for projecting an image on a screen includes a liquid crystal display (LCD) for displaying an image, a light source positioned behind the LCD for supplying light to project the image displayed on the LCD, a projection lens positioned in front of the LCD for focusing the light projected from the LCD onto the screen, and deflection means positioned between the LCD and the screen for deflecting the light focused through the projection lens to move the image position on the screen.

19 Claims, 2 Drawing Sheets

5,636,912

LIQUID CRYSTAL PROJECTOR

BACKGROUND OF THE INVENTION

1. Field of the Invention

The present invention relates to a liquid crystal projector, and more particularly, to an image displayed by a liquid crystal projector.

2. Discussion of the Related Art

FIG. 1 is a schematic diagram of a conventional liquid crystal projector. As shown, the conventional liquid crystal projector is constructed such that a liquid crystal display (LCD) panel 19 is positioned in the middle of a liquid crystal projector housing 11. A first polarizing plate 14 is positioned in front of LCD panel 19, and a second polarizing plate 15 is positioned behind LCD panel 19. A focusing lens 16 and an infrared (IR)/ultraviolet (UV) cut-off filter 17 are positioned behind second polarizing plate 15 at a predetermined distance. A light source 18 is positioned behind IR/UV cut filter 17 at a predetermined distance. A projection lens 12 is positioned in an opening of the liquid crystal projector housing 11, and a field lens 13 is positioned in front of first polarizing plate 14 at a predetermined distance.

The operation of the conventional liquid crystal projector having the aforementioned configuration will now be described.

Light is emitted from light source 18 and irradiated onto the LCD, constituted by LCD panel 19, first polarizing plate 14, and second polarizing plate 15, each positioned in front of and behind LCD panel 19 via IR/UV cut filter 17 and focusing lens 16. Accordingly, the image displayed on the LCD is projected by the incident light via focusing lens 16, and the projected light is focused via field lens 13 and projection lens 12 to then be displayed on a screen. Therefore, the conventional liquid crystal projector can display an image signal recorded on a magnetic tape by a view-finder, and projects the image displayed on the LCD to a screen.

However, since the conventional liquid crystal projector does not have a separate deflection device, the region on the screen used for display is always fixed. Thus, when a user intends to move the screen region up/down and left/right, the overall body of liquid crystal projector system must also be moved.

SUMMARY OF THE INVENTION

The present invention has been made in view of the above circumstances and has an object to provide a liquid crystal projector in which the position of an image displayed on a screen is easily adjusted up/down or left/right.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the liquid crystal projector for projecting an image on a screen of this invention comprises a liquid crystal display (LCD) for displaying an image, a light source positioned behind the LCD for supplying light to project the image displayed on the LCD, a projection lens positioned in front of the LCD for focusing the light projected from the LCD onto the screen, and deflection means positioned between the LCD and the screen for deflecting the light focused through the projection lens to move the image position on the screen.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIGS. 4a and 4b are schematic diagrams of dual lenses, in which FIG. 4a shows a compact dual lens, and FIG. 4b shows an adhesive-applied dual lens.

DETAILED DESCRIPTION OF THE INVENTION

Figure 1:
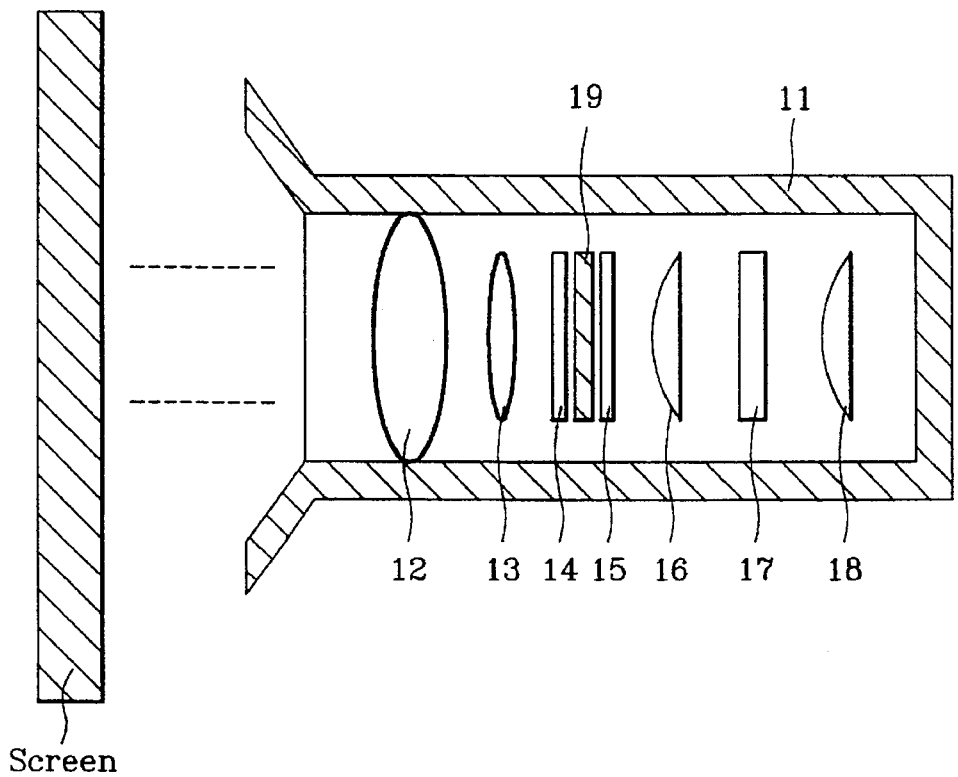
FIG. 1 is a schematic diagram of a conventional liquid crystal projector.
Figure 2:
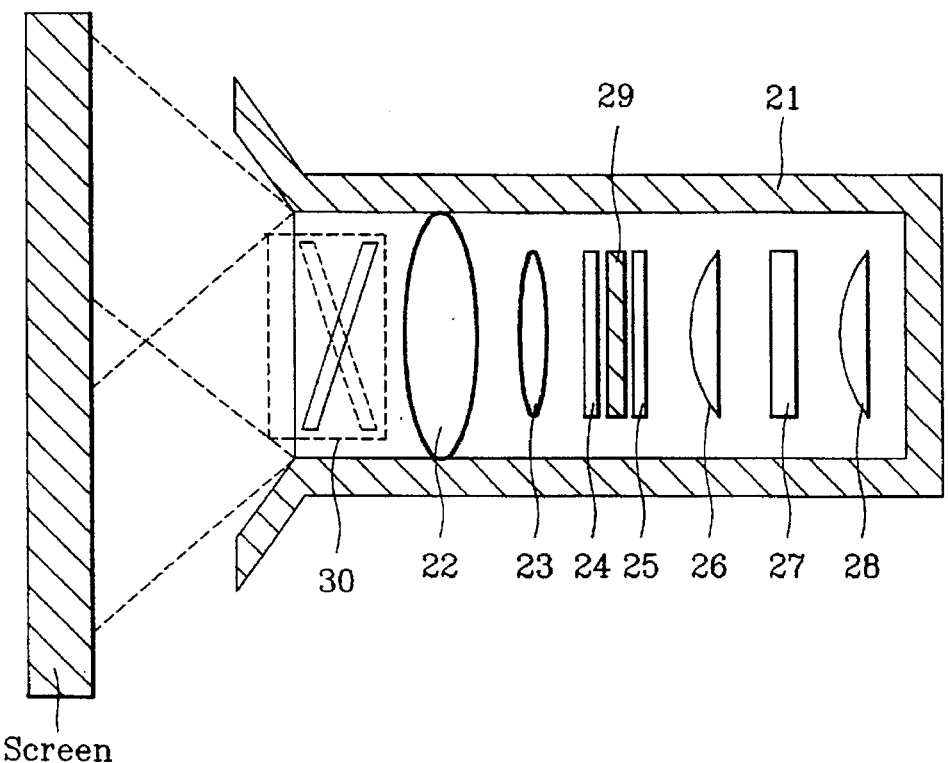
FIG. 2 is a schematic diagram of a liquid crystal projector according to the present invention.

A liquid crystal projector according to the present invention is constructed by adding a deflector 30 to a conventional liquid crystal projector. As shown in FIG. 2, the liquid crystal projector is constructed such that a liquid crystal display (LCD) panel 29 is positioned inside a liquid crystal projector housing 21. A first polarizing plate 24 is positioned in front of LCD panel 29, and a second polarizing plate 25 is positioned behind LCD panel 29. A focusing lens 26 and an infrared (IR)/ultraviolet (UV) cut filter 27 are respectively positioned behind second polarizing plate 25 at predetermined distances. A light source 28 is positioned behind IR/UV cut filter 27 at a predetermined distance. A deflector 30 is positioned in an opening of liquid projector housing 21, a projection lens 22 is positioned behind liquid crystal projector housing 21 at a predetermined distance, and a field lens 23 is positioned in front of first polarizing plate 24 at a predetermined distance from projection lens 22. The LCD, which includes LCD panel 29, first polarizing plate 24, and second polarizing plate 25, displays an image. A light source 28 provides light for projecting the image displayed on the LCD, and projection lens 22 focuses the image-projected light onto the screen. Deflector 30, which is disposed in front of projection lens 22, deflects the light focused via projection lens 22 to move the position of the image on the screen.

The operation of the liquid crystal projector according to the present invention having the aforementioned configuration will now be described.

Light source 28, IR/UV cut-off filter 27, focusing lens 26, LCD, field lens 23, and projection lens 22 operate in the same manner as the conventional liquid crystal projector. That is to say, light is emitted from light source 28, the emitted light is irradiated onto the LCD, which includes by LCD panel 29, first polarizing plate 24, and second polarizing plate 25 positioned in front of and behind the LCD panel 29, via IR/UV cut-off filter 27 and focusing lens 26. Accordingly, the image displayed on the LCD is projected by the light provided from focusing lens 26, and the projected light is focused and displayed on the screen via field lens 23 and projection lens 22.

In the preferred embodiment, deflector 30 varies the projection direction of liquid crystal projector to easily adjust the projection position of the image on the screen. The light focused from projection lens 22 is reflected and deflected to any direction by deflector 30, thereby adjusting the projection position of the image on the screen.

The detailed configuration and operation of deflector 30 will now be described with reference to FIGS. 3 and 4.

Figure 3:
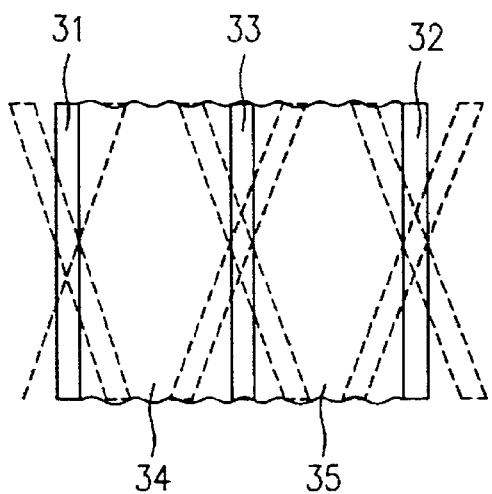
FIG. 3 is schematic diagram of a deflector shown in FIG. 2.

As shown in FIG. 3, deflector 30 includes first and second deflection members 31 and 32 positioned at a predetermined distance from each other. The position angle of the first and second deflection members 31 and 32 may be varied to move the position of the image on the screen. A third deflection member 33 is positioned between first and second deflection members 31 and 32 at a predetermined distance for varying the position angle and removing desired portions of the spectrum generated in first and second deflection members 31 and 32. A first visco-elastic material portion 34 is formed of a first visco-elastic material between first and third deflection members 31 and 33 and changed in its thickness by third deflection member 33. A second visco-elastic material portion 35 is formed of a second visco-elastic material between second and third deflection members 32 and 33 and changed in its thickness by third deflection member 33. Here, the first and second visco-elastic materials forming first and second visco-elastic material portions 34 and 35 have different dispersion coefficients $n_1$ and $n_2$.

The operation of deflector 30 having the aforementioned configuration will now be described.

First, by varying the position angles of first and second deflection members 31 and 32, the image is moved on the screen to a desired position.

If the light projected from the conventional liquid crystal projector is reflected and deflected to a selected direction, the image region is moved on the screen. However, if the light is refracted, spectral components are additionally generated, which impairs the screen resolution. Therefore, the position angle of third deflection member 33 is varied to correct this spectral phenomenon generated by the light deflection from first and second deflection members 31 and 32.

That is to say, if the position angle of third deflection member 33 is varied, the spectral phenomenon generated due to the thickness change of first and second visco-elastic material portions 34 and 35 is solved.

Therefore, first and second deflection members 31 and 32 function to deflect the projected light and to define the position of an image on the screen. In this manner, in order to move the position of the image, if the projected light is deflected, spectral components are generated. To solve this problem, the position angle of third deflection member 33 is varied to change the thickness of first and second visco-elastic material portions 34 and 35 having different dispersion coefficients $n_1$ and $n_2$ from each other, thereby controlling the generation of color aberrations to obtain a high resolution image on the screen.

The principle of controlling the generation of color aberrations due to the spectrum will be described in detail with reference to FIGS. 4a and 4b. In particular, the following general discussions and analysis concerning solving the equation $\partial k=0$ are useful in explaining the control of color aberrations as implemented by the structures shown in FIG. 3.

Figure 4A:
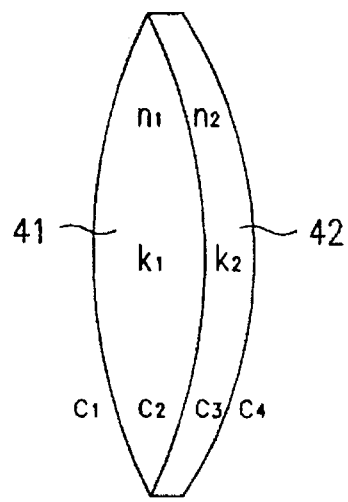

As shown in FIG. 4a, the dual lens is constituted by a convex lens 41 having a refractive index ($n_1$), a 1/focal distance ($k_1$), and a curvature ratio ($c_2$), and concave lens 42 having a refractive index ($n_2$), a 1/focal distance ($k_2$), and a curvature ratio ($c_3$), both lenses 41 and 42 being tightly fixed to each other.

The dual lens having the aforementioned configuration satisfies the decoloring condition at $\partial k=0$. Here, k(1/focal distance)$=k_1+k_2-\{(d_j k_1 k_2)/n_1\}$ where the distance between the two lenses, $d_j$, is approximately equal to 0.

Therefore, $k=k_1+k_2$.

$k_1=k_{11}+k_{12}-\{(d_1 k_{11} k_{12})/n_1\}(d_1=0) = k_{11}k_{12}=c_1(n_1-1)+c_2(1-n_1)=(c_1-c_2)(n_1-1)$.

$k_2=k_{21}+k_{22}-\{(d_2 k_{21} k_{22})/n_2\}(d_2=0) = k_{21}+k_{22}=c_3(n_2-1)+c_4(1-n_2)=(c_3-c_4)(n_2-1)$.

Since $k=k_1+k_2$, $k=(c_1-c_2)(n_1-1)+(c_3-c_4)(n_2-1)$.
Here, if k is differentiated, the decoloring condition is $\partial k=\partial[(c_1-c_2)(n_1-1)+(c_3-c_4)(n_2-1)]=0$.

As described above, the tightly adhered dual lens satisfies the decoloring condition.

Figure 4B:
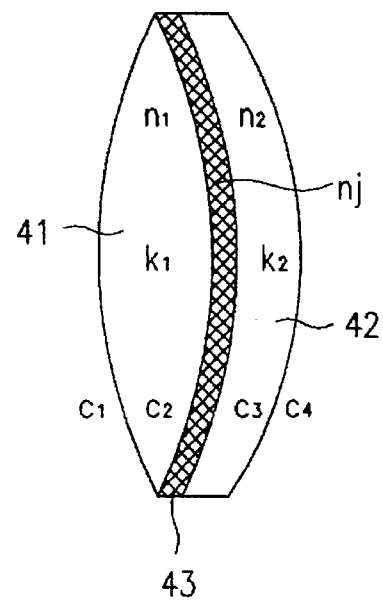

Next, the dual lens shown in FIG. 4b includes by a convex lens 41 having a refractive index ($n_1$), a 1/focal distance ($k_1$), and a curvature ratio ($c_2$), and concave lens 42 having a refractive index ($n_2$), a 1/focal distance ($k_2$), and a curvature ratio ($c_3$), both lenses 41 and 42 being adhered to each other by an adhesive material 43, such as caradian balsam.

The dual lens adhered by adhesive material as noted above satisfies the following decoloring condition that $\partial k=0$. Here, k(1/focal distance)$=k_1 k_2-\{(d_j K_1 k_2)/n_j\}$($n_j$ is a refractive index of adhesive material.)

$=k_1+k_2$.

Then, $k_1=c_1(n_1-1)+c_2(n_j-n_1)$ and $k_2=c_3(n_2-n_j)+c_4(1-n_2)$.

Therefore, $\partial k=\partial[(c_1-c_2)n_1+(c_3-c_4)n_2+(c_2-c_3)n_j+c_4-c_1]=0$.

As described above, the dual lens adhered by an adhesive material also satisfies the decoloring condition.

The decoloring principle of the dual lens can be explained with reference to the deflector according to the present invention.

That is to say, irrespective of the presence or absence of an adopted adhesive material, the decoloring condition of the dual lens is satisfied by properly adjusting first and second visco-elastic materials and the position angle of third deflection member 33 in the deflector 30 of the present invention.

As described above, according to the liquid crystal projector of the present invention, the image region on a screen can be varied up/down and left/right in a user's option, and the generation of color aberration can be prevented beforehand to improve the image resolution.

The foregoing description of preferred embodiments of the invention has been presented for purpose of illustration an description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A liquid crystal projector for projecting an image on a screen comprising:

a liquid crystal display (LCD) for displaying an image;

a light source positioned behind the LCD for supplying light to project the image displayed on the LCD;

a projection lens positioned in front of the LCD for focusing the light projected from the LCD onto the screen; and a deflector positioned between the LCD and the screen for deflecting the light focused through the projection lens to move the image position on the screen, the light passing through the deflector.

2. The liquid crystal projector of claim 1, wherein the deflector is in front of the projection lens.

3. The liquid crystal projector of claim 1, wherein the deflector includes:

first and second deflection members positioned at a predetermined distance from each other, each being movable to a desired angle to move the image position on the screen;

a third deflection member positioned between the first and second deflection members at a predetermined location being movable to a desired angle to remove unwanted spectral components generated in the first and second deflection members;

a first visco-elastic material between the first and third deflection members and changed in its thickness by movement of the third deflection member; and a second visco-elastic material portion formed of a second visco-elastic material between the second and third deflection members and changed in its thickness by movement of the third deflection member.

4. The liquid crystal projector of claim 3, wherein the first and second visco-elastic materials have different dispersion coefficients.

5. The liquid crystal projector of claim 4, wherein the third deflection member is adapted to change thicknesses of the first and second visco-elastic materials.

6. The liquid crystal projector of claim 1, further comprising a field lens positioned between the projection lens and the LCD.

7. The liquid crystal projector of claim 1, further comprising a first polarizing plate and a second polarizing plate positioned on either side of the LCD, respectively.

8. The liquid control projection of claim 7, further comprising a focusing lens positioned between the second polarizing plate and the light source.

9. The liquid crystal projector of claim 1, further comprising a filter positioned next to the light source.

10. The liquid crystal projector of claim 9, wherein the filter is an infrared/ultraviolet cut-off filter.

11. A liquid crystal projector for projecting an image on a screen comprising:

a liquid crystal display (LCD) for displaying an image;

a light source positioned behind the LCD for supplying light to project the image displayed on the LCD;

a projection lens positioned in front of the LCD for focusing the light projected from the LCD onto the screen; and a deflector positioned between the LCD and the screen for deflecting the light focused through the projection lens to move the image position on the screen, the deflector having a visco-elastic portion.

12. A liquid crystal projector for projecting an image on a screen comprising:

a liquid crystal display (LCD) for displaying an image;

a light source positioned behind the LCD for supplying light to project the image displayed on the LCD;

a projection lens positioned in front of the LCD for focusing the light projected from the LCD onto the screen; and a deflector positioned between the LCD and the screen for deflecting the light focused through the projection lens to move the image position on the screen, the deflector including:

first and second deflection members positioned at a predetermined distance from each other, each being movable to a desired angle to move the image position on the screen, a third deflection member positioned between the first and second deflection members at a predetermined location being movable to a desired angle to remove unwanted spectral components generated in the first and second deflection members, a first visco-elastic material between the first and third deflection members and changed in its thickness by movement of the third deflection member, and a second visco-elastic material portion formed of a second visco-elastic material between the second and third deflection members and changed in its thickness by movement of the third deflection member.

13. The liquid crystal projector of claim 12, wherein the deflector is in front of the projection lens.

14. The liquid crystal projector of claim 12, wherein the first and second visco-elastic materials have different dispersion coefficients.

15. The liquid crystal projector of claim 14, wherein the third deflection member is adapted to change thicknesses of the first and second visco-elastic materials.

16. The liquid crystal projector of claim 12, further comprising a field lens positioned between the projection lens and the LCD.

17. The liquid crystal projector of claim 12, further comprising a first polarizing plate and a second polarizing plate positioned on either side of the LCD, respectively.

18. The liquid control projection of claim 17, further comprising a focusing lens positioned between the second polarizing plate and the light source.

19. The liquid crystal projector of claim 12, further comprising a filter positioned next to the light source.

* * * * *